April 20, 1954     N. K. TURNBULL ET AL     2,675,872
CHRONOGRAPH
Filed May 20, 1952
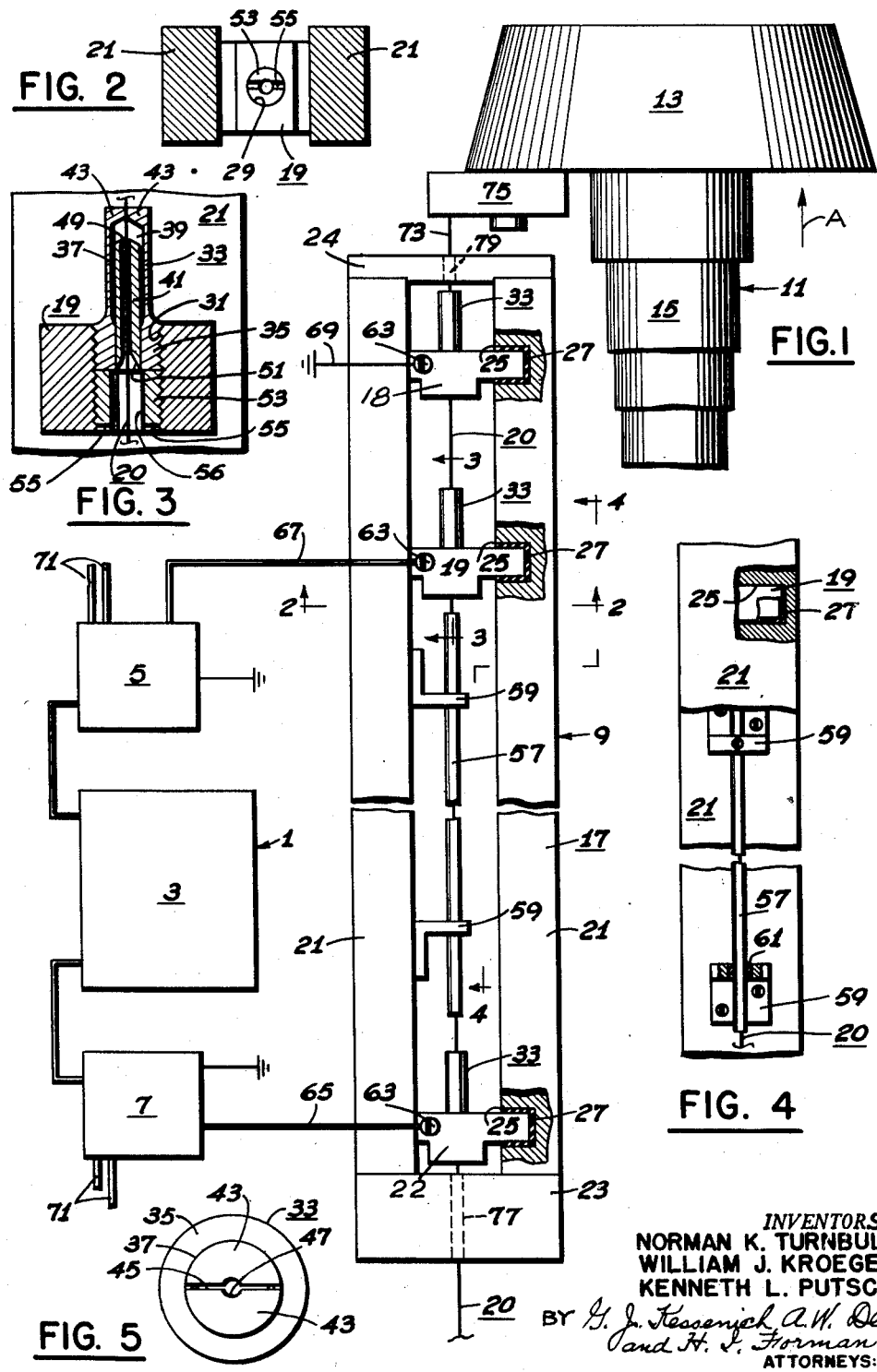
INVENTORS
NORMAN K. TURNBULL
WILLIAM J. KROEGER
KENNETH L. PUTSCHER Patented Apr. 20, 1954

2,675,872

UNITED STATES PATENT OFFICE 2,675,872

CHRONOGRAPH

Norman K. Turnbull, Pitman, N. J., and William J. Kroeger and Kenneth L. Putscher, Philadelphia, Pa.

Application May 20, 1952, Serial No. 288,992

10 Claims. (Cl. 161—18)

(Granted under Title 35, U. S. Code (1952), sec. 266)

The invention described herein may be manufactured and used by or for the Government for governmental purposes without the payment to us of any royalty thereon.

The present invention relates to a velocity measuring device and more particularly to an improved circuit interrupting switch useful particularly with apparatus for determining the velocity of a projected mass.

In the art of measuring the velocity of a projected mass, the electrically operated chronograph has proved most practicable. This instrument depends for its operation upon interrupting electrical circuits thereby to effect initiation and cessation of movement of the recording indicators or counting mechanism. Prior art arrangements have, for example, employed fine wires or wire screens disposed in spaced apart relation and connected in circuit with the chronograph. Upon breaking of the wire or screen, the electrical circuit of which it is a part is interrupted thereby controlling operation of the apparatus to obtain factors necessary to determine velocity measurements in a manner well known in the art.

Although prior art devices of the type mentioned above have proved satisfactory for some applications, it has been found that these arrangements do not provide as accurate a measurement as would be desirable for other applications, or the particular arrangement is not advantageously suitable or applicable to other applications.

In order to overcome the above as well as other disadvantages of prior art devices of this kind, the apparatus of the present invention is provided for effecting operation of an electronic chronograph useful particularly in testing catapults or other relatively low velocity projected masses.

A primary object of the present invention is to provide an improved apparatus for determining the velocity of relatively low velocity projected masses which is positive and efficient in operation.

It is also an object of the present invention to provide an improved switch mechanism for electrically operated velocity measuring devices.

A further object of the present invention is to provide an improved switch mechanism for a chronograph system which will more effectively and positively control the action of the recording indicators or other counting apparatus.

Another object of the present invention is to provide a switch mechanism for a chronograph system which can be adjusted to compensate for minor variations in reference base line measurements.

Still further it is an object of the present invention to provide a switch mechanism for electrically operated velocity measuring devices which is simple in construction and operation and which is highly efficient in use for the intended purpose.

In accordance with the present invention, there is provided a switch for effecting interruption of a plurality of independent electrical circuits associated with a chronograph system. The switch comprises at least three terminals connected electrically with the chronograph circuits and a circuit interrupting conductor disposed in slidable contact with the terminals. The conductor is arranged for attachment to a mass to be projected for velocity measuring purposes. In response to projection of the mass, the conductor is withdrawn from contact with the terminals and successively interrupts the electrical circuits thereby effecting operation of the chronograph mechanism in a manner well known in the art.

The novel features of the present invention, as well as additional objects and advantages thereof, will be better understood from the following detailed description, when read in connection with the accompanying drawing in which:

Fig. 1 is a plan view of a chronograph system as applied to a velocity measuring apparatus, the system being equipped with a switch in accordance with the present invention, portions of the system being shown schematically and the switch being shown partly in elevation and partly in section to show certain construction details;

Fig. 2 is a sectional view of the switch shown in Fig. 1, taken on the line 2—2 of Fig. 1;

Fig. 3 is an enlarged sectional view of one of the switch terminal members, taken on the line 3—3 of Fig. 1;

Fig. 4 is a sectional view of a portion of the switch shown in Fig. 1, taken along the line 4—4 of Fig. 1, certain parts thereof being broken away to show construction details; and Fig. 5 is an enlarged end view of a terminal collet member.

Referring more particularly to the drawing, wherein similar reference characters designate corresponding parts throughout, there is shown in Fig. 1 an electronic chronograph apparatus 1 comprising an electric counter 3, or other suitable electronic device for recording intervals of time, two pre-amplifier units 5, 7 and a preferred embodiment of a switch 9 in accordance with the present invention.

For the purpose of illustration, the chronograph apparatus is represented as applied to parts of an apparatus 11 employed in testing a safety device to enable rapid exit from an aircraft of any of its occupants. The parts of the apparatus 11 shown in Fig. 1 comprise a projectile in the form of a mass or weight 13 attached to an explosive propellant-powered catapult 15. The mass represents the combined weight of the occupant and the chair upon which he is seated.

The chronograph apparatus 1 comprises a plurality of independent electrical circuits, one circuit of which is arranged to initiate operation of the electric counter 3 and another circuit of which is arranged to effect cessation of operation of the counter. In operation, the apparatus is responsive to successive interruptions of the respective electrical circuits thereby to control operation of the counter in a manner well known in the art.

The switch 9 of the present invention is provided for effecting interruption of the electrical circuits of the chronograph 1 and comprises a support 17, a plurality of terminals or contact members 18, 19, 22 carried by the support and a circuit interrupting conductor member 20. The support 17 comprises a rectangular frame of any suitable material and includes two side portions or members 21 and two end portions or members 23, 24 the members being secured to each other by any suitable means.

The terminals 18, 19, 22 comprise block members of electric conducting material and are disposed in alignment on the support 17. In the particular arrangement shown, the terminals are supported with their ends disposed within recesses 25 provided in the support side portions 21. Insulating material 27 is disposed between the terminals and the side portions in order to electrically insulate the terminals from the support 17 as well as from each other.

The terminals 18, 19, 22 have a centrally disposed opening or bore 29 extending therethrough which is arranged with its axis parallel to the longitudinal axis of the support 17. The wall 31 of each terminal opening 29 is threaded to receive a collet member 33. The collet member 33 comprises a cylindrical, externally threaded end portion 35 and a bifurcated end portion 37 extending from the cylindrical portion. The collet 33 has a bore 39 extending through its axis which is of a diameter in the region of the cylindrical end portion 35 sufficient to press fit one end of a cylindrical bushing 41 therein. The portion of the collet bore within the bifurcated end portion 37 is of a diameter greater than the external diameter of the bushing 41 so that the legs or arms of the bifurcated end portion will be free to move in radial directions with respect to the bushing. The ends 43 of the bifurcated portion remote from the cylindrical portion 35 extend inwardly toward each other and terminate with a narrow slot 45 between them. The bifurcated end portions 43 are also provided with a centrally disposed bore 47 for receiving the conductor member 20. The arms of the bifurcated end portion are somewhat resilient and are biased in a manner to constantly engage the conductor 20 while it is disposed through the collet member. Thus, a slidable contact is established between the conductor 20 and the collet 33.

The bushing is of a length to extend substantially the full length of the collet bore 39 but spaced from the bifurcated portion ends 43. The bushing is also provided with a longitudinal bore 49 extending therethrough which is of a diameter slightly greater than the diameter of the conductor member 20. The end 51 of the bushing bore disposed within the cylindrical portion 35 is outwardly flared for the purpose of facilitating threading the conductor member 20 through the bushing.

A lock nut or member 53 is provided for locking the collet 33 against movement from an adjusted position within each terminal member. The lock member is cylindrical and is externally threaded to fit the threaded terminal bore 29. One end of the lock member is provided with a slot 55 to receive a tool for tightening the lock member thereby to secure the collet member in place. The lock member 53 is also provided wih a longitudinal bore 56 extending therethrough which is of a diameter greater than the conductor member 20.

A tubular guide or member 57 is also mounted on the switch support 17 and is disposed between the terminals 19, 22. The guide member has a central bore which is disposed in alignment with the collet and bushing bores for guiding the conductor member 20. Any suitable supports, such as the angle bars 59, may be provided for the tubular guide. The guide should be of a length to substantially extend between the terminals but not come in contact with them. The inside diameter of the guide should, of course, be greater than the diameter of the conductor member 20. While only one guide member 57 is shown in the drawing, other guide members may be provided between terminals where the distance of separation of the terminals warrants their use. In order to prevent short circuiting of the apparatus, insulation 61 is provided between the guide member and its support. However, the guide may also be made from a non-conducting material in which case the insulating material 61 is unnecessary.

The terminals 18, 19, 22 are arranged on the support 17 with their bores 29 in alignment. In the particular embodiment illustrated, the middle terminal 19 and one end terminal 22 are disposed apart a predetermined distance constituting a reference base line the length of which is used as one of the measurements in determining the velocity of the particular apparatus being tested. In order to accurately fix the distance of separation between the terminals disposed at opposite ends of the reference base line, the collets are made adjustable. The means for effecting this adjustment is provided by the threaded arrangement of the collet in the terminal. The end terminal 18 may be disposed at any convenient distance from the middle terminal 19 and on the opposite side thereof with respect to the one end terminal 22. Screws 63 or other suitable connecting members are provided on each terminal to facilitate making electrical connections thereby to operatively connect the terminals with the chronograph circuits.

In the particular arrangement shown, the terminals 19, 22 disposed apart a predetermined distance are connected independently with separate ones of the chronograph electrical circuits. The end terminal 22 thereof is connected by a single conductor 65 with the circuit of the amplifier unit 7 for initiating chronograph operation. The intermediate terminal 19 is connected by a single conductor 67 with the circuit of the pre-amplifier unit 5 for terminating operation of the chronograph. The other end terminal 18 is connected by a single conductor 69 to a source of ground potential common to both circuits. Thus, the electrical circuit of the one pre-amplifier unit 5 is connected electrically with two of the terminals 18, 19 and the electrical circuit of the other pre-amplifier unit 7 is connected electrically with one 18 of the first two mentioned terminals and the third terminal 22 of the switch. Power for the chronograph circuits is supplied through leads 71.

The conductor member 20 comprises a wire or other suitable electrical conducting member. One end 73 of the wire is attached by any suitable means, such as the arm 75, to the mass or member 13 so that it is responsive to firing of the projectile and will interrupt the chronograph circuits as it is withdrawn from contact with the switch terminals. The wire is of a length sufficient to extend from its connection with the arm 75 through the respective components of the switch.

In preparing the switch for operation, the wire or contact member 20 is threaded through an opening 77 provided in one support end member 23, successively through the components of the terminals 18, 19, 22 and the tubular guide 57, through the opening 79 in the other end member 24 and then attached to the arm 75. The bifurcated end portions of the collet members 33 are normally spaced apart a distance less than the diameter of the wire 20 thus making it necessary to pry them apart slightly to thread the wire through the collet. The bifurcated end portions being somewhat resilient will, when released, be brought to bear on the surface of the wire thereby making a good, uniform, electrical contact between them. Thus, it will be recognized by persons skilled in the art, that the resilient bifurcated contacts will automatically compensate for any wear at the point of circuit interruption which, in other devices, would otherwise alter the length of the reference base line and affect the net result. When the wire is completely threaded through all of the terminals, both chronograph circuits are closed and the chronograph is said to be conditioned for operation.

In operating the velocity measuring apparatus, the switch 9 is oriented with respect to the projectile preferably in a manner that the conductor member 20 is substantially parallel to the path of the projectile. In this position, the switch frame with its contact members is mounted in a fixed position. When the firing mechanism of the testing apparatus is actuated, the projectile forces the mass 13 in the direction of arrow A. Inasmuch as the wire 20 is attached to the mass and the switch frame is mounted in a fixed position, the wire will be slidably withdrawn from contact which each of the terminals in turn to successively interrupt the circuits of the chronograph and actuate the timing apparatus in a manner well known in the art. The guide members 57 serve to prevent whipping of the wire during the withdrawal thereof from the support and also serve to facilitate threading of the wire through the components of the switch.

With the foregoing switch arrangement, it will become apparent to persons skilled in the art that the apparatus may be disposed apart from the firing apparatus any convenient distance since the wire conductor member 20 may be made any length beyond the minimum length necessary to operate the switch. Thus, the chronograph apparatus 1 may be remotely disposed in a position which not only facilitates resetting of the apparatus for further tests, but also enables measurements to be conveniently made at any point along the trajectory of the projectile.

From the foregoing description, it will become apparent to those persons skilled in the art that the present invention provides an improved chronograph apparatus which has distinct advantages over prior art devices of its kind. The apparatus is not only positive in operation but, because of the adjustable and wear compensating features of the switch member, more nearly accurate measurements and results are obtainable. In addition thereto, the arrangement permits quick and easy resetting of the control apparatus thereby facilitating the testing of projectiles.

Although there is shown and described but a single embodiment of the present invention, various other modifications and changes within the spirit of the invention will, no doubt, readily suggest themselves to those skilled in the art. For example, the middle terminal may be connected with a source of ground potential common to both chronograph circuits and the remaining terminals connected individually with separate ones of the independent circuits. Therefore, it is desired that the above description be considered merely as illustrative and not as limiting.

We claim:

1. An apparatus for determining the velocity of a projected mass comprising a chronograph system including a counter and having a plurality of electrical circuits, switch means for interrupting said circuits comprising a support, at least three terminals carried by said support, said terminals being disposed at spaced intervals, and conductor means adapted for attachment to said mass and being disposed in slidable contact with said terminals in a manner to normally close said circuits, one of said circuits being connected electrically with first and second ones of said terminals, another of said circuits being connected electrically with said first terminal and a third terminal, operation of said counter being initiated in response to interruption of said one circuit and being terminated in response to interruption of said other circuit, interruption of said one and said other circuits being effected upon projection of the mass and the withdrawal of said conductor means by said mass respectively from contact with said second and said third terminals.

2. The invention as defined in claim 1 wherein said terminals are disposed in alignment and in a manner to successively interrupt said circuits upon withdrawal of said conductor means.

3. An apparatus for determining the velocity of a projected mass comprising a chronograph system including a counter and having a plurality of electrical circuits, switch means for interrupting said circuits comprising a support, at least three terminals comprising first, second and third contact members carried by said support, and conductor means adapted for attachment to said mass and being disposed in slidable contact with said contact members thereby to normally close said circuits, said first contact member being connected electrically with a source of ground potential common to said circuits, said second and third contact members being connected electrically with separate ones of said circuits and being disposed apart a predetermined distance, operation of said counter being initiated in response to interruption of a first one of said circuits and being terminated in response to interruption of a second one of said circuits, interruption of said first and said second circuits being effected upon projection of the mass and the successive withdrawal of said conductor means by said mass respectively from said second and said third contact members.

4. The invention as defined in claim 3 wherein at least one of said second and third contact members includes means for adjusting the distance between said second and third members.

5. The invention as defined in claim 3 wherein said contact members comprise collets, said collets including resilient portions biased for engagement with said conductor means and also including means for effecting adjustment of the distance between said second and third contact members.

6. In a chronograph system for determining the velocity of a projected mass and including a counter, said system having at least two electrical circuits, switch means for said circuits comprising a support, at least three terminals carried by said support, said terminals being disposed in spaced apart relation to each other, a first one of said terminals being connected electrically with a source of ground potential common to said electrical circuits, second and third ones of said terminals being connected electrically and independently with first and second ones of said circuits, and conductor means adapted for attachment to said mass and being disposed in slidable contact normally with said terminals thereby to form a conductive path for said circuits between said first and said second terminals and also between said first and said third terminals, operation of said counter being initiated in response to interruption of said first one of said circuits and being terminated in response to interruption of said second one of said circuits, interruption of said first and said second circuits being effected upon projection of the mass and the withdrawal of said conductor means by said mass respectively from contact with said second and said third terminals.

7. The invention as defined in claim 6 wherein said conductor means comprises a wire, and wherein said switch means includes at least one tubular guide member carried by said support and disposed between said terminals, each said guide member being of a diameter greater than said wire to permit said wire to freely pass therethrough.

8. The invention as defined in claim 6 wherein said terminals are insulated from electrical contact with said support, said second and third terminals being disposed to successively interrupt said independent circuits in response to withdrawal of said conductor means.

9. The invention as defined in claim 8 wherein said second and said third terminals are disposed apart a predetermined distance.

10. The invention as defined in claim 9 wherein said terminals comprise collets having resilient portions for engaging said conductor means, said collets including means for adjusting said collets with respect to said support thereby to accurately fix the distance between said second and third terminals.

References Cited in the file of this patent

UNITED STATES PATENTS

| Number | Name | Date |
|---|---|---|
| 1,357,281 | Du Pont | Nov. 2, 1920 |
| 2,373,589 | Mos | Apr. 10, 1945 |
| 2,526,206 | Dolan | Oct. 17, 1950 |
| 2,622,678 | Peterson | Dec. 23, 1952 |

FOREIGN PATENTS

| Number | Country | Date |
|---|---|---|
| 84,088 | Germany | May 3, 1895 |